May 10, 1938.   C. M. EASON   2,116,739
CLUTCH MECHANISM
Filed Aug. 22, 1936   4 Sheets-Sheet 3
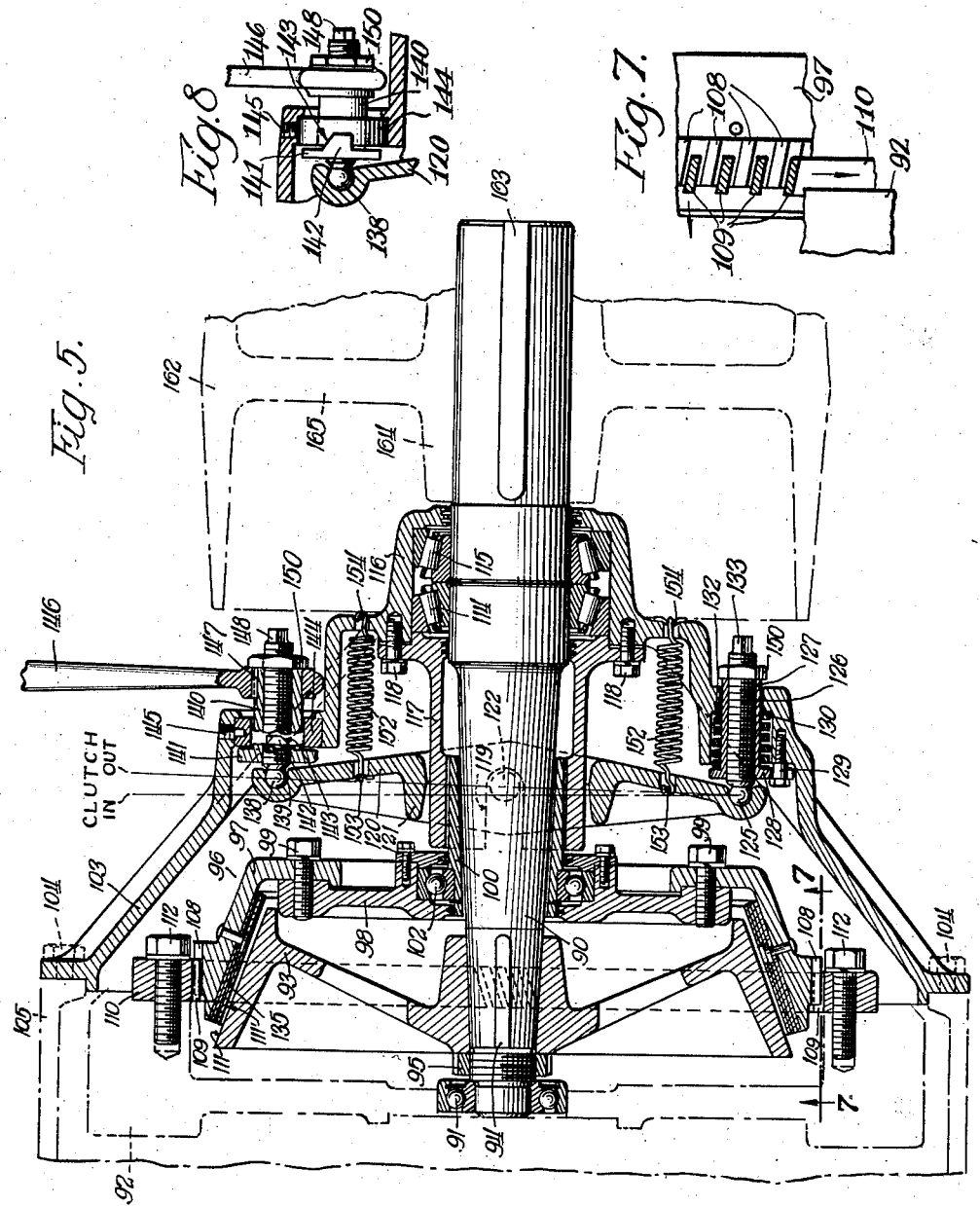
Inventor:
Clarence M. Eason,
By Brown, Jackson, Boettcher & Dienner
Attys.

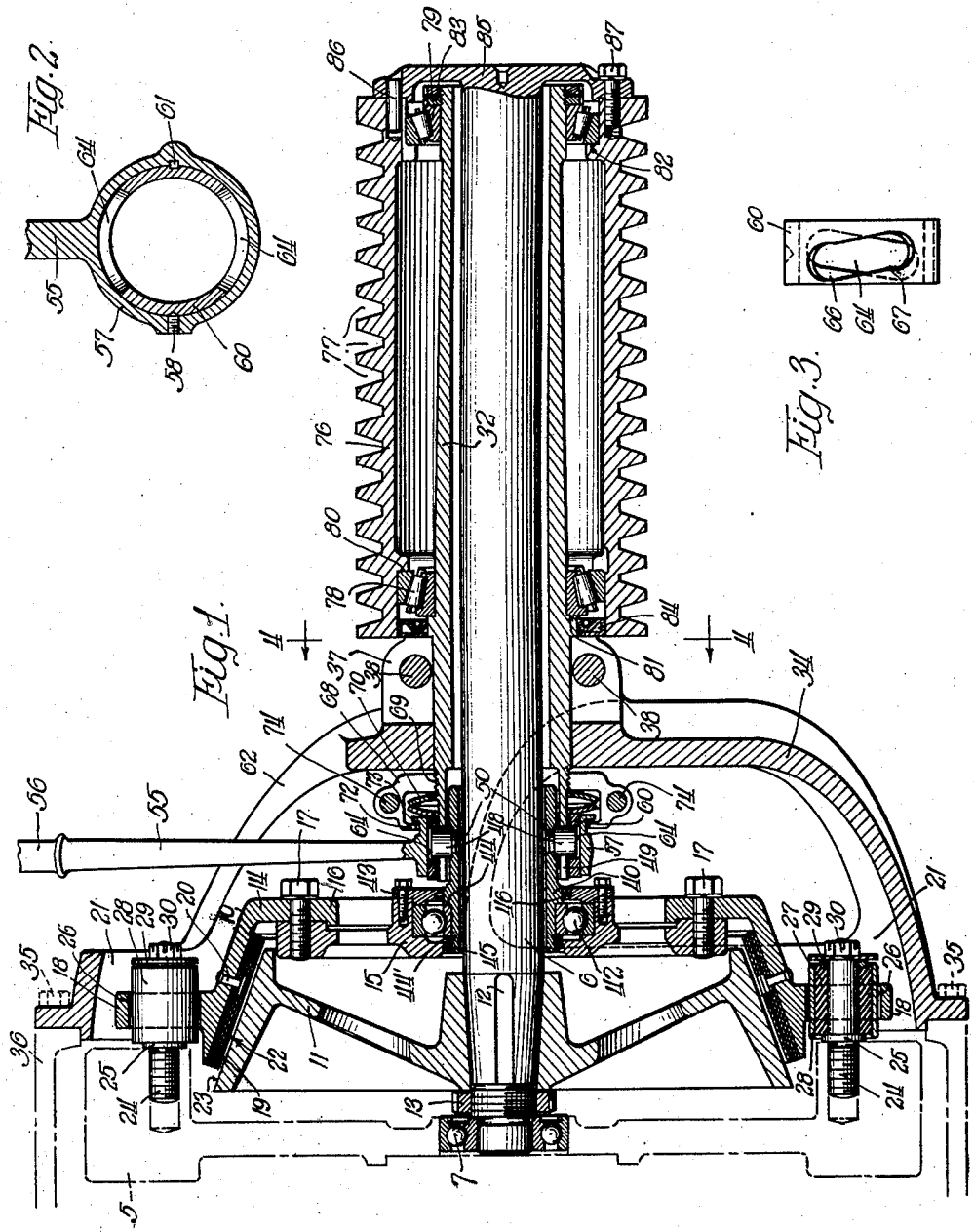

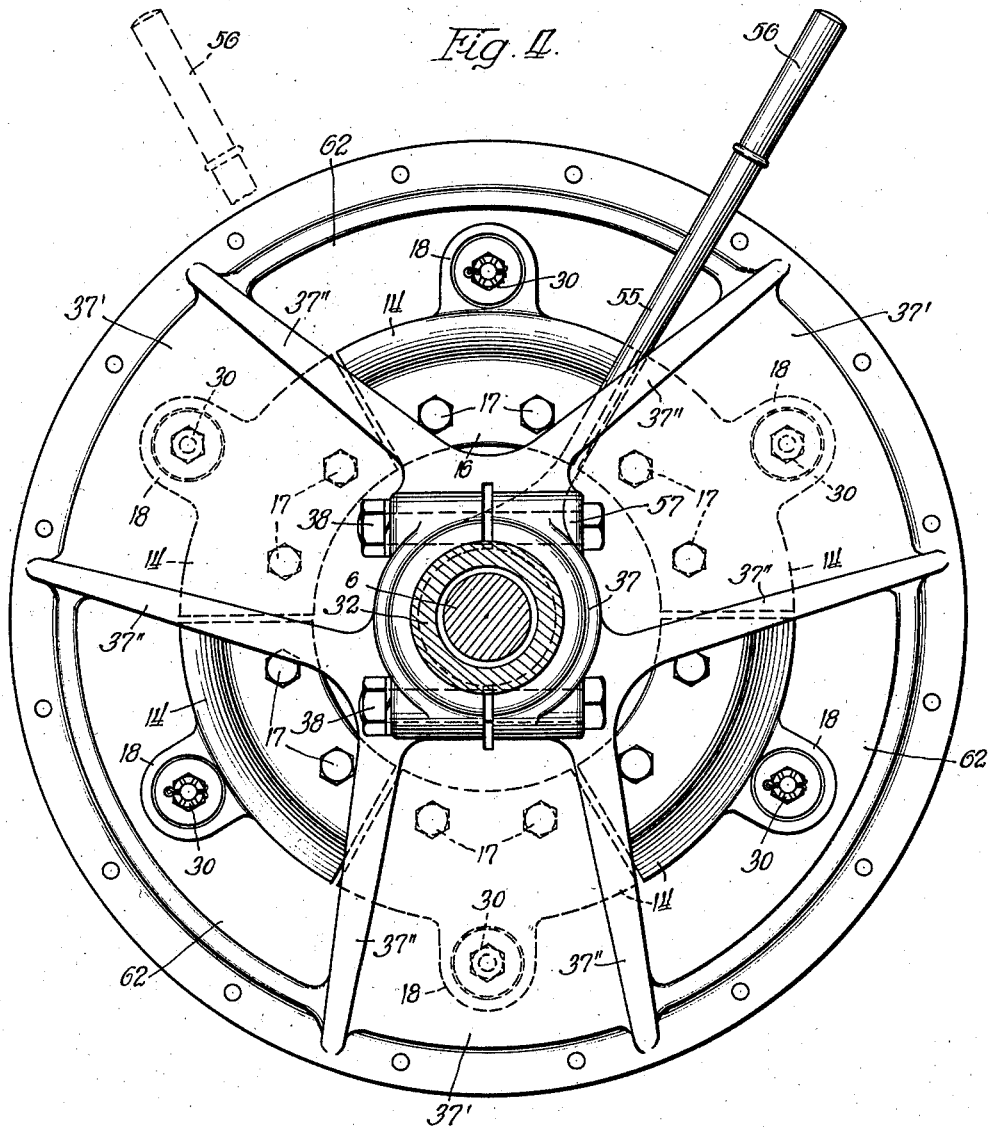

May 10, 1938.  C. M. EASON  2,116,739
CLUTCH MECHANISM
Filed Aug. 22, 1936    4 Sheets-Sheet 4

Inventor:
Clarence M. Eason.
By
Attys.

Patented May 10, 1938

2,116,739

UNITED STATES PATENT OFFICE 2,116,739

CLUTCH MECHANISM

Clarence M. Eason, Waukesha, Wis., assignor to Industrial Clutch Company, a corporation of Wisconsin Application August 22, 1936, Serial No. 97,336

12 Claims. (Cl. 192—66)

This invention relates to improvements in clutch mechanisms.

While the two embodiments of the invention which I shall describe hereinafter in connection with the drawings show the clutch mechanism in connection with power take-off devices, it is to be understood that in its broader aspects the clutch mechanism of the present invention is not limited to use with power take-off mechanisms but may be employed elsewhere as suitable and desired.

One of the main objects of the invention is to provide, in combination with a driving member and a driven member, a pair of clutch members having cooperating surfaces for connecting the driving and driven members and means ahead and externally of said cooperating clutch surfaces for connecting one of the clutch members yieldingly to the driving member, the yielding connection being of a character to obviate stresses which would otherwise be imposed by misalignment of the parts.

It is a further and more specific object of the invention to provide a yielding driving connection of this character between the driving engine flywheel and the driving female cone member of the clutch.

It is also an object to provide a clutch mechanism which may be built and assembled as an entity and applied as a unit to the driving flywheel or other driving member whereby it is possible to secure the desired relation of the parts of the clutch and to control all fits to secure proper functioning before applying the clutch to the driving member.

Another object is to provide a clutch mechanism wherein all thrust loads are self-contained within the clutch itself and are not at any time transferred to the driving engine flywheel or other driving parts.

Another object is to provide novel and useful shifting means for engaging and disengaging the clutch, and more specifically a shifting mechanism including a double-acting helical cam with a yielding backing which constitutes a yielding support for spring loading the parts of the clutch so that the device operates quietly and without looseness. This yielding backing also prevents overloading of the clutch bearing.

Another object is to provide an improved shifting mechanism including a walking beam or equalizer lever and neck yoke, and means for adjusting the clutch for wear, together with means for spring loading the clutch parts.

Another object is to provide a power take-off mechanism having a tubular supporting member with the power take-off pulley mounted full floating thereon and, in its more specific aspects, with the driving shaft for the pulley extending through the tubular supporting member and having driving connection with the pulley.

Another object is to provide an improved form of driving connection between the driving flywheel or other driving member and the driving female cone member or other clutch member which it is desired to connect with the driving member, which driving connection will take up the stresses which would otherwise be imposed due to misalignment and the like.

Further objects and advantages of the invention will be apparent from the following detailed description, taken in connection with the accompanying drawings, in which:

Figure 1 is a longitudinal section through a clutch and power take-off mechanism embodying the present invention;

Figure 2 is a fragmentary detail section showing the cross head on the operating lever and the cam ring associated therewith;

Figure 3 is an elevational view of the cam ring member of the clutch shifting mechanism;

Figure 4 is a transverse sectional view taken on the line 4—4 of Figure 1;

Figure 5 is a longitudinal section similar to Figure 1 through another form of device embodying the present invention;

Figure 7 is a detail view taken generally along the line 7—7 of Figure 5, and

Figure 8 is a detail view of a portion of the clutch operating mechanism shown in Figure 5.

Figure 6:
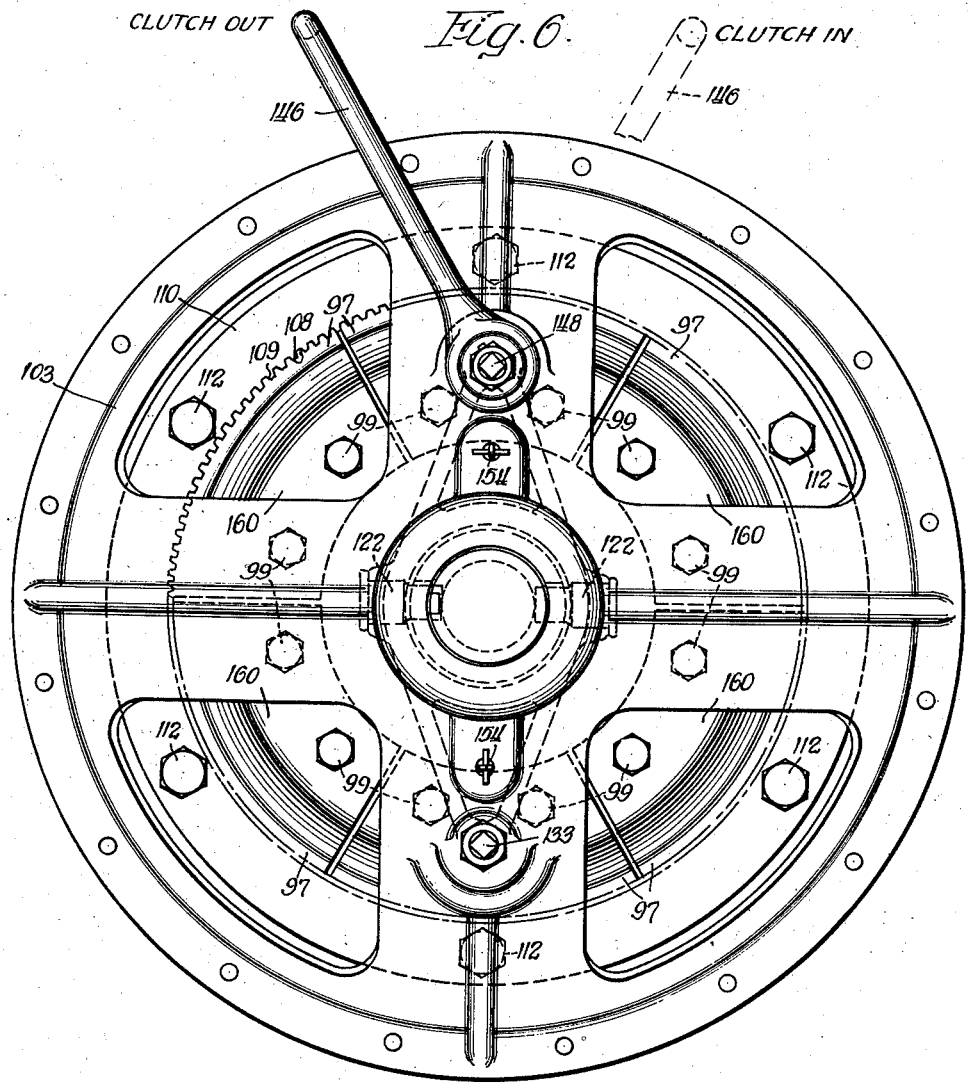
Figure 6 is an end view of the device shown in Figure 5 with the power take-off pulley removed.

With reference now to the drawings in the embodiment of the invention shown in Figures 1 to 4, inclusive, 5 designates a driving member, the member shown being the flywheel of a driving engine or motor, not shown. The driven shaft 6 is piloted axially in a bearing 7 in the driving flywheel 5 and constitutes the drive shaft for the power take-off mechanism in which this form of the invention is embodied.

The clutch comprises a driving female cone member 10 and a driven male cone member 11. The member 11 is fixedly secured upon the tapered end of the shaft 6 by splines 12 and a nut 13, or otherwise, as desired.

The driving female cone 10 comprises a female cone rim 14 and an inner cone rim supporting part 15. The rim 14 is preferably formed of relatively light-weight material, such as aluminum, to reduce the inertia that must be overcome in the operation of the device. This rim 14 is also preferably divided into six or any other desired number of equal length segments, each having a radial flange 16 secured to the inner part 15 by means of bolts 17. Each segment also has an integral outwardly extending radial lug 18. By dividing the female cone rim into two or more cone rim segments these segments may be removed and replaced at will without taking down or disassembling the entire device, and, with the segments of equal length, they are interchangeable and therefore require no predetermined positioning relative to each other.

The inner conical surfaces of the cone rim segments constituting the cone rim 14 are preferably faced or lined with suitable friction material 19. This friction material may be in the form of arcuate facing pieces each of a length substantially equal to the length of the respective segments and riveted at 20, or otherwise suitably secured to said segments. If any bulge or looseness occurs in the friction facing material 19, it will be thrown by centrifugal force out of engagement with the male cone member 11 in the operation of the device by reason of its application internally to the female cone member 10 instead of externally to the male cone member 11. This obviates the drag which results where bulged or loose friction facings on the male cone member are thrown out centrifugally into engagement with the cooperating female cone member.

The female cone member 10 is yieldingly connected at 21 to the flywheel 5 ahead and externally of the cooperating clutch surfaces 22 and 23. This yielding connection, which constitutes a driving connection for the female cone member 10, comprises studs 24 secured in tapped openings in the flywheel 5 to a position where the integral flanges 25 on these studs seat against the adjacent surface of the flywheel. The ends of the studs 24 which project from the flywheel extend into openings 26 in the lugs 18 on the female cone rim segments. Bushings 27 of rubber or other deformable and preferably resilient material are disposed about the studs 24 and within metal sleeves 28 which surround these bushings and are positioned in the openings 26 for axial sliding movement of the female cone member thereon. The drive is transmitted from the flywheel 5 to the female cone member 10 through the studs 24 and bushings 27 and the bushings 27 absorb angular stresses imposed, for example, by misalignment of the parts. The bushings 27 are compressed endwise against flanges 25 by collars 29 and cooperating nut members 30 threaded upon the adjacent reduced ends of the studs 24 to bind the sleeves 28 and bushings 27 firmly in place on the studs 24.

The disposition of the driving connections 21 out at a large radius and externally of the clutch surfaces 22 and 23 reduces the load on the studs 24. Fewer studs may therefore be employed, and in fact, in one embodiment of the invention, one stud may be employed for each female cone segment, as shown. At the same time the disposition of the driving connections 21 ahead of the clutch surfaces 22 and 23 permits building and assembling the clutch as an entity or unitary assembly which may be applied to the flywheel as a self-contained unit. This makes it possible to secure the desired relation of the parts of the clutch and to control all fits to secure proper functioning before applying the clutch to the driving flywheel.

The connection of the female cone member 10 to the flywheel enables positioning the driving connections 21 externally of the clutch surfaces 22 and 23 with the resulting advantages above described. Also, with this arrangement, the female cone member 10 encloses the driven male cone member 11.

The end of the shaft 6 opposite the end at which the clutch is disposed extends freely through a stationary tubular shaft or sleeve 32 and the clutch mechanism is enclosed within a clutch housing 34 bolted at 35 to the flywheel housing 36. The boss 37 of the clutch housing 34 is split and the sleeve 32 is held stationary therein by clamping bolts 38. The boss 37 is supported by three arms 37' well ribbed at 37''.

The female cone member 10 is carried by a sleeve 40 which surrounds the shaft 6 and is shiftable axially along the shaft and at one end axially within the adjacent end of the stationary tubular member 32. The female cone 10 and sleeve 40 are connected together by means of a ball bearing 42 the outer race of which is held between the inner female cone rim supporting part 15 and a retainer ring 43 bolted thereto. The inner race of the bearing 42 is held between a shoulder 44 on the sleeve 40 and a split retainer ring 44' held in a groove in the sleeve 40 so that upon axial shifting movement of the sleeve 40 in either direction the female cone member 10 is shifted axially as a unit therewith. Oil retainer grooves may be provided at 45 and 46.

Diametrically opposite trunnions 48 carried by the sleeve 40 engage in diametrically opposite slots 49 in the adjacent end of the stationary tubular member 32 and thereby prevent turning of the sleeve 40, at the same time allowing free axial shifting movement of the sleeve. The driving female cone 10 turns freely with respect to the sleeve 40 on the ball bearing 42. The trunnions 48 may be pressed into openings in the sleeve 40 and riveted at their inner ends at 50, or otherwise joined rigidly to the sleeve 40.

Within the broader aspects of the present invention the shifting means shown and described in my copending application, Serial No. 95,064, filed August 10, 1936, or any other suitable shifting means, may be employed for shifting the female cone member 10 into and out of engagement with the male cone member 11.

The particular shifting means shown in connection with the embodiment of Figures 1 to 4, inclusive, comprises a hand lever 55 having at its outer end a handle 56 and at its inner end a round cross head 57. Located and held particularly against endwise displacement in the cross head 57 by means of a set screw 58 is a cam ring 60. This cam ring 60 is keyed at 61 to turn with the turning movement of the cross head 57 which accompanies swinging movement of the lever 55. The housing 34 has a plurality of openings 62 for ventilating the clutch and permitting removal and replacement of the female cone rim segments therethrough, and the lever 55 extends out through one of these openings, which opening permits the lever 55 to be swung to engage and disengage the clutch.

The cam ring 60 is provided with a pair of diametrically opposite cam slots 64 (Figure 3). The outer ends of the trunnions 48 extend into the cam slots 64, which cam slots are formed along their intermediate portions to shift the female cone member 10 into engagement with the male cone member 11 when the hand lever 55 is swung to its left-hand position, (Figure 4), and to disengage the female cone member 10 from the male cone member 11 when the lever 55 is swung to the right-hand position, (Figure 4). Each cam slot 64 is preferably provided with a flat end 66 for holding the clutch in engagement and with an opposite flat end 67 for holding the clutch out of engagement.

A split and internally threaded set collar 68 is screwed at 69 upon the adjacent end of the tubular member 32. A "Bellville" spring washer 70, comprising a pair of cupped spring discs arranged with the outer edges of their concave sides in abutment, or other spring washer or yielding means, is disposed within the set collar 68 annularly about the tubular member 32 and between the adjacent end of the cam ring 60 and the shoulder afforded by the opposite side of the set collar 68 to provide a yielding backing for the double acting cam provided by the cam ring 60. This spring washer or yielding means also spring loads the clutch parts so that the device operates quietly and without looseness. There is preferably a slight preloading or initial tension in the spring washer means 70, which spring washer means constitutes a yielding support taking the reaction of the lever 55 in holding the male and female clutch cones in driving engagement, thus preventing overloading of the bearing 42 and providing and maintaining a predetermined amount of pressure between the clutch members 10 and 11. If the clutch member 10 heats and expands at a faster rate than the member 11, the spring means 70 acts as a follow-up to keep the clutch member 10 in engagement with the clutch member 11 with the desired amount of pressure.

The split collar 68 extends over the adjacent end of the cross head 57 and has an integral flange 72 which interlocks with a flange 73 on the cross head 57 to hold the same against endwise displacement under the action of the spring washer means 70. Clamp bolts 74 clamp the split collar 68 fixedly in place on the tubular member 32 and permit adjustment of the split collar 68 for the purpose of adjusting or advancing the female cone member 10 toward the male cone member 11 to adjust the clutch for wear of the friction lining material 19.

The power take-off pulley 76 with its grooved periphery 77 shown in connection with this embodiment of the invention is mounted at its opposite ends upon the tubular member 32 by means of end thrust roller bearings 78 and 79. The outer race of the bearing 78 cooperates with an internal shoulder 80 on the pulley 76 and the inner race of this bearing cooperates with an annular shoulder 81 on the tubular member 32. The outer race of the bearing 79 cooperates with an internal shoulder 82 on the pulley 76 and the inner race of this bearing is held in place by a nut and locknut threaded upon the tubular member 32 as shown at 83. An oil retainer, provided at 84, revolves with the pulley 76.

The bearing arrangement above described provides a full floating mounting for the pulley 76. The bearing 78 is preferably larger than the bearing 79 for assembly purposes and this larger bearing 78 has adequate thrust-taking capacity to take the end thrust for the male cone member.

The end of the shaft 6 opposite the end at which the clutch is disposed is provided with an integral driving flange 85 or other suitable means for transmitting the drive from the shaft 6 to the full floating pulley 76. The flange 85 extends out over the outer bearing assembly and closes the outer end of the hollow pulley 76 and has driving connection with the pulley 76 by a pair of diametrically opposite driving dowel pins 86. Four or any other suitable number of equi-spaced bolts 87 secure the pulley 76 to the flange 85. In use, the power take-off belt, (not shown), is trained over the wide grooved periphery of the pulley 76.

From the foregoing it will now be apparent that the clutch is engaged by swinging the hand lever 55 to its left-hand position (Figure 4) and is disengaged by swinging the lever 55 to its right-hand position as shown in this figure. All thrust loads are self-contained within the clutch unit itself and are not at any time transferred to the driving engine flywheel. And the clutch is adapted to be built and assembled as an entity or unitary assembly which can be applied to the driving flywheel as a self-contained unit. The thrust loads are not excessive in a cone clutch and for structural reasons the bearings of the present device are of adequate size to take the thrust loads.

The tubular support shaft 32 with the pulley mounted full floating thereon and with the shaft 6 extending therethrough and having driving connection with the pulley is another important aspect of the present invention.

In the embodiment of the invention shown in Figures 5 and 6 the driven shaft 90 is piloted axially in a bearing 91 in the driving flywheel 92 and constitutes the drive shaft for the power take-off mechanism, as in the preceding embodiment. The driven male cone member 93 is fixed upon the tapered end of the shaft 90 by splines 94 and a nut 95.

The driving female cone 96, as before, comprises an outer cone rim preferably formed of relatively light weight material, such as aluminum, and preferably divided into six or any other desired number of equal length segments 97 secured to the inner cone rim supporting part 98 by means of bolts 99. The sleeve 100 surrounds the shaft 90 and is shiftable axially along the shaft and the cone member 96 and sleeve 100 are connected together by means of a ball bearing 102 as in the preceding embodiment of the invention. The clutch mechanism is enclosed in a clutch housing 103 bolted at 104 to the flywheel housing 105.

In this embodiment of the invention the female cone rim segments 97 are provided at the outer periphery of the female cone member with external helical gear teeth 108 which mesh with corresponding internal helical gear teeth 109 formed in a ring 110 bolted at 112 to the driving flywheel. As will be apparent from Figure 7, the helical gear teeth permit the desired shifting action of the female cone member without binding and may be formed to produce a "servo" action. As the ring 110 is driven, say in the direction of the arrow shown in the lower portion of Figure 7, there is a component of force indicated by the arrow in the left hand part of Figure 7, which assists in bringing the driving clutch member 96 into firm engagement with the driven clutch member 93. A similar action takes place while the clutch is being disengaged. In this modification, stresses which would otherwise be imposed due to misalignment are taken by the tooth looseness between the helical teeth 108 and 109 instead of in bushings such as the bushings 27 of the preceding embodiment of the invention.

As before, however, the driving connection between the driving flywheel 92 and the female cone 96 is disposed ahead and externally of the cooperating cone clutch surfaces 111 and 111' with the advantages previously set forth.

The shaft 90 is journaled for rotation in main roller bearings 114 and 115 supported in a hub 116 formed integral with the clutch housing 103. A sleeve member 117 bolted at 118 to the hub part 116 of the housing 103 is provided with a pair of diametrically opposite slots 119 opening from its opposite end. This sleeve surrounds the shaft 90 and the sleeve 100 is shiftable axially within the slotted end of the sleeve 117.

The walking beam or equalizer lever 120 has an integral neck yoke 121 loosely surrounding the adjacent end of the sleeve 117. This beam or lever 120 carries diametrically opposite trunnion studs 122 which pass through the slots 119 and at their inner ends are engaged in diametrically opposite openings in the sleeve 100 to shift the sleeve 100 and thereby the driving female cone 96 into engagement with the driven male cone 93 by rocking movement of the lever 120. The engagement of the trunnion studs 122 in the slots 119 holds the sleeve 100 against turning movement, the female cone 96 turning freely with respect to the sleeve 100 about the ball bearing 102.

The lower end of the lever 120 (Figure 5) has a socket in which is seated the ball end 125 of the screw 126 which affords a ball and socket fulcrum for the lower end of the lever. The screw 126 has threaded engagement with a sleeve 127 provided with a flange 128. Two or more cap screws 129 have their shanks passing through openings in the flange 128 and threaded into the housing 103 and with their heads cooperating with the flange 128. These screws are adapted for preloading the spring 130 and to hold the sleeve 127 against turning. The spring 130 spring loads the clutch, keeping all parts under spring tension so that a correct pressure is maintained between the friction surfaces of the clutch at all times during its engagement, regardless of slight changes in relative diameters which may be caused by heating and relative expansion of the driving and driven members of the clutch when in operation. The spring 130 thus functions similarly to the spring washer 70, described above. The spring 130, which is shown of square section, encircles the sleeve 127 and is confined between the flange 128 and a shoulder 132. The end of the screw 126 opposite the end at which the ball end 125 is disposed is formed at 133 for engagement by a suitable tool for adjusting the female cone member 96 toward the male cone member 93 to take up for wear of the friction lining 135.

The upper end of the lever 120 has a socket in which is seated the ball end 138 of the screw 139. The screw 139 has threaded engagement with a sleeve 140, which sleeve is flanged at 141 and provided with an integral cam lug 142, as best shown in Figure 8. The cam lug 142 cooperates with a cam surface 143 formed in a ring 144 secured in a cylindrical recess in the housing 103 by a set screw 145.

The shifting means comprises a hand lever or arm 146 keyed at 147 upon the sleeve 140. The end of the screw 139 opposite the end at which the ball end 138 is disposed is formed at 148 for engagement by a suitable tool to adjust the female cone member 96 toward the male cone member 93 in order to take up for wear of the friction lining 135. When the screws 126 and 139 are operated to adjust the clutch for wear these parts are secured in adjusted position by lock nuts 150 provided on these screws.

In this embodiment of the invention the female cone member 96 is normally maintained out of engagement with the male cone member 93 by means of retracting springs 152 anchored at 153 to the lever 120 and at 154 to the clutch housing 103. The clutch is engaged by swinging the lever 146 to the right hand position shown in dotted lines in Figure 6. This movement of the lever 146 turns the sleeve 140 in a direction to cause the cam lug 142, by its cooperation with the cam surface 143, to project the sleeve and screw assembly 140, 139 axially inwardly, thereby rocking the lever 120 about the ball fulcrum 125 to the left as viewed in Figure 5. This rocking movement of the lever moves the sleeve 100 and the female cone member 96 to the left and into engagement with the male cone member 93 through the trunnions 122. When the lever 146 is moved to its left-hand position as shown in Figure 6 the clutch engaging cooperation of the cam lug 142 with the cam surface 143 is released and the retracting springs 152 return the parts to disengaged position as shown in Figure 5.

In this embodiment of the invention, as in the preceding embodiment of the invention, all thrust loads are self-contained within the clutch mechanism itself and are not at any time transferred to the driving engine flywheel.

The housing 103 of the device shown in Figures 5 and 6 has a plurality of openings 160 for ventilating the clutch and permitting removal and replacement of the female cone rim segments 97.

The power take-off pulley 162 is splined or keyed at 163 directly upon the shaft 90. The hub part 164 of the pulley to the left-hand side of the connecting web 165 between the hub and rim of the pulley is preferably relatively short so that the rim of the pulley overhangs the hub 116. This overhang or carrying of the rim of the pulley over the bearings 114, 115 brings the center line of the pulley close to the center line of these main bearings, thereby shortening the lever arm supporting the pulley and reducing the reaction of the pulley load on the clutch and bearings.

I do not intend to be limited to the precise details shown or described.

I claim:

1. In a cone clutch, a driving member, a driven shaft, a generally axially outwardly facing driven clutch member fixed to said driven shaft and forming the male member of the cone clutch, a generally axially inwardly facing driving clutch member forming the female member of the clutch, said driving and driven clutch members having cooperating surfaces adapted to be engaged and disengaged to connect and disconnect said driving member and driven shaft, said axially inwardly facing female driving clutch member being divided into a plurality of segments secured to a segment supporting member exteriorly of the driven clutch member with which they cooperate, and means ahead and outside of the cooperating surfaces of said clutch members for yieldingly and detachably connecting the individual segments of said driving clutch member to said driving member, the outward disposition of said segments relative to the driven member with which they cooperate facilitating the removal of said segments.

2. In combination, a driving member, a driven shaft piloted in the center of said driving member, a driven clutch member fixed against relative rotation and held against endwise displacement on said shaft, a driving clutch member shiftable into and out of engagement with said driven clutch member and having sliding and yielding driving connection with said driving member at its outer periphery, a housing for the clutch mechanism, a tubular member carried by said housing and surrounding said driven shaft, a sleeve carried by the driving clutch member and surrounding and shiftable along said driven shaft, slots in said tubular member, a double-acting cam ring surrounding said tubular member and having diametrically opposite cam slots therein, trunnions carried by said sleeve and extending through the slots in said tubular member and engaging in said cam slots, and a lever for turning said cam ring to shift said driving clutch member into and out of engagement with the driven clutch member.

3. In combination, a driving member, a driven shaft piloted in the center of said driving member, a driven clutch member fixed against relative rotation and held against endwise displacement on said shaft, a driving clutch member shiftable into and out of engagement with said driven clutch member and having sliding and yielding driving connection with said driving member at its outer periphery, a housing for the clutch mechanism, a tubular member carried by said housing and surrounding said driven shaft, a sleeve carried by the driving clutch member and surrounding and shiftable along said driven shaft, slots in said tubular member, a double-acting cam ring surrounding said tubular member and having diametrically opposite cam slots therein, trunnions carried by said sleeve and extending through the slots in said tubular member and engaging in said cam slots, and a lever for turning said cam ring to shift said driving clutch member into and out of engagement with the driven clutch member, each of said cam slots having a flat portion at each end for holding the driving clutch member in and out of engagement with said driven clutch member.

4. In combination, a driving member, a driven shaft piloted in the center of said driving member, a driven clutch member fixed against relative rotation and held against endwise displacement on said shaft, a driving clutch member shiftable into and out of engagement with said driven clutch member and having sliding and yielding driving connection with said driving member at its outer periphery, a housing for the clutch mechanism, a tubular member carried by said housing and surrounding said driven shaft, a sleeve carried by the driving clutch member and surrounding and shiftable along said driven shaft, slots in said tubular member, a double-acting cam ring surrounding said tubular member and having diametrically opposite cam slots therein, trunnions carried by said sleeve and extending through the slots in said tubular member and engaging in said cam slots, a lever for turning said cam ring to shift said driving clutch member into and out of engagement with the driven clutch member, a split set collar threaded upon the tubular member and operable to adjust the driving clutch member for wear, and spring means interposed between said collar and said cam ring for spring loading the clutch to obviate looseness and provide a quiet running device.

5. In combination, a driving member, a driven shaft piloted in the center of said driving member, a driven clutch member fixed against relative rotation and held against endwise displacement on said shaft, a driving clutch member shiftable into and out of engagement with said driven clutch member and having sliding and yielding driving connection with said driving member at its outer periphery, a housing for the clutch mechanism, a tubular member secured to said housing and surrounding said shaft, a sleeve carried by the driving clutch member and surrounding and shiftable along said shaft, slots in said tubular member, an equalizer lever, a fulcrum for said lever on one side of said shaft, means on the other side of said shaft for rocking said lever about its fulcrum to engage the driving clutch member with the driven clutch member, trunnions passing through the slots in said tubular member and engaging said lever and the sleeve of said driving clutch member at opposite ends for shifting the driving clutch member by rocking movement of said lever and holding the sleeve of said driving clutch member against turning, and spring means for retracting said driving clutch member from engagement with said driven clutch member.

6. In combination, a driving member, a driven shaft piloted in the center of said driving member, a driven clutch member fixed against relative rotation and held against endwise displacement on said shaft, a driving clutch member shiftable into and out of engagement with said driven clutch member and having sliding and yielding driving connection with said driving member at its outer periphery, a housing for the clutch mechanism, a tubular member secured to said housing and surrounding said shaft, a sleeve carried by the driving clutch member and surrounding and shiftable along said shaft, slots in said tubular member, an equalizer lever, a fulcrum for said lever on one side of said shaft, means on the other side of said shaft for rocking said lever about its fulcrum to engage the driving clutch member with the driven clutch member, trunnions passing through the slots in said tubular member and engaging said lever and the sleeve of said driving clutch member at opposite ends for shifting the driving clutch member by rocking movement of said lever and holding the sleeve of said driving clutch member against turning, spring means for retracting said driving clutch member from engagement with said driven clutch member, and means at the lever actuating clutch member, and at the fulcrum for said lever for adjusting the driving clutch member for wear.

7. In combination, a driving member, a driven shaft piloted in the center of said driving member, a driven clutch member fixed against relative rotation and held against endwise displacement on said shaft, a driving clutch member shiftable into and out of engagement with said driven clutch member and having sliding and yielding driving connection with said driving member at its outer periphery, a housing for the clutch mechanism, a tubular member secured to said housing and surrounding said shaft, a sleeve carried by the driving clutch member and surrounding and shiftable along said shaft, slots in said tubular member, an equalizer lever, a fulcrum for said lever on one side of said shaft, means on the other side of said shaft for rocking said lever about its fulcrum to engage the driving clutch member with the driven clutch member, trunnions passing through the slots in said tubular member and engaging said lever and the sleeve of said driving clutch member at opposite ends for shifting the driving clutch member by rocking movement of said lever and holding the sleeve of said driving clutch member against turning, spring means for retracting said driving clutch member from engagement with said driven clutch member, and preloaded spring means at the fulcrum for said equalizer lever for spring loading the clutch to obviate looseness and provide a quiet running device.

8. In combination, a driving member, a driven shaft piloted in the center of said driving member, a driven clutch member fixed against relative rotation and held against endwise displacement on said shaft, a driving clutch member shiftable into and out of engagement with said driven clutch member and having sliding and yielding driving connection with said driving member at its outer periphery, a housing for the clutch mechanism, a tubular member secured to said housing and surrounding said shaft, a sleeve carried by the driving clutch member and surrounding and shiftable along said shaft, slots in said tubular member, an equalizer lever, a fulcrum for said lever on one side of said shaft, means on the other side of said shaft for rocking said lever about its fulcrum to engage the driving clutch member with the driven clutch member, trunnions passing through the slots in said tubular member and engaging said lever and the sleeve of said driving clutch member at opposite ends for shifting the driving clutch member by rocking movement of said lever and holding the sleeve of said driving clutch member against turning, spring means for retracting said driving clutch member from engagement with said driven clutch member, said lever rocking means comprising a sleeve having a hand lever fixed thereto, a ring surrounding said sleeve, and cooperating cam means on said sleeve and said ring.

9. In a clutch, a pair of clutch members, a driven shaft, one of said clutch members being shiftable relative to the other clutch member, a housing for the clutch mechanism, a tubular member carried by said housing and surrounding said driven shaft, a sleeve carried by the shiftable clutch member and surrounding and shiftable along said driven shaft, slots in said tubular member, a double-acting cam ring surrounding said tubular member and having diametrically opposite cam slots therein, trunnions carried by said sleeve and extending through the slots in said tubular member and engaging in said cam slots, a lever for turning said cam ring to shift said one clutch member into and out of engagement with said other clutch member, and spring means taking the reaction of said cam ring in moving said shiftable clutch member in one direction.

10. In a clutch, a pair of clutch members, a driven shaft, one of said clutch members being shiftable relative to the other clutch member, a housing for the clutch mechanism, a tubular member secured to said housing and surrounding said shaft, a sleeve carried by the shiftable clutch member and surrounding and shiftable along said shaft, slots in said tubular member, an equalizer lever, a fulcrum for said lever on one side of said shaft, means on the other side of said shaft for rocking said lever about its fulcrum to engage said one clutch member with the other clutch member, and trunnions passing through the slots in said tubular member and engaging said lever and the sleeve of said shiftable clutch member at opposite ends for shifting the latter member by rocking movement of said lever and holding the sleeve of said shiftable clutch member against turning.

11. In a cone clutch, an inner male cone clutch member having an axially rearwardly tapering conical clutch surface, an outer female cone clutch member movable axially rearwardly away from said inner male cone clutch member to disengage the clutch, said outer female cone clutch member comprising a central section and a cone rim embracing said male cone clutch member, said cone rim being divided into a plurality of arcuate cone rim segments, each having an axially inwardly facing cone rim part with a radial flange at the inner end of the same disposed on the rear side of said central section so that a straight axially rearward movement of the segment moves the latter out of contact with both said central section and the axially rearwardly tapering conical clutch surface of said inner clutch member, and means accessible from the outer side of said central section for removably securing the segments to the outer face of the central section.

12. A clutch mechanism for power take-offs and the like, comprising a pair of clutch members movable axially relative to one another, a control lever movable transversely relative to axis of said member, cam means controlled by transverse rocking movement of said lever for forcing one of said clutch members axially into driving engagement with the other clutch member, and spring means taking the reaction of said cam means in moving said one clutch member into driving engagement with the other clutch member, said spring means providing for movement of said cam means and said control lever together to maintain said clutch members in driving engagement regardless of relative expansion of the clutch members due to a temperature increase thereof when the clutch members are engaged.

CLARENCE M. EASON.